United States Patent
Wang

(10) Patent No.: US 9,017,750 B2
(45) Date of Patent: Apr. 28, 2015

(54) COCOA AND SUGAR AGGLOMERATE FOR FLAVORED BEVERAGES AND METHOD OF FORMING SAME

(71) Applicant: The Hershey Company, Hershey, PA (US)

(72) Inventor: Xiaoying Wang, Hummelstown, PA (US)

(73) Assignee: The Hershey Company, Hershey, PA (US)

(*) Notice: Subject to any disclaimer, the term of this patent is extended or adjusted under 35 U.S.C. 154(b) by 21 days.

(21) Appl. No.: 13/945,211

(22) Filed: Jul. 18, 2013

(65) Prior Publication Data

US 2015/0024093 A1    Jan. 22, 2015

(51) Int. Cl.
*A23G 1/00*      (2006.01)
*A23G 1/56*      (2006.01)

(52) U.S. Cl.
CPC ............... *A23G 1/0016* (2013.01); *A23G 1/56* (2013.01)

(58) Field of Classification Search
None
See application file for complete search history.

(56) References Cited

U.S. PATENT DOCUMENTS

| | | | | |
|---|---|---|---|---|
| 2,077,819 | A | * | 4/1937 | Zizinia ............................ 426/93 |
| 3,006,763 | A | * | 10/1961 | Marcy et al. ................... 426/285 |
| 3,053,663 | A | * | 9/1962 | Donahue ......................... 426/93 |
| 4,308,288 | A | * | 12/1981 | Hara et al. ..................... 426/285 |
| 4,640,839 | A | * | 2/1987 | Hsu ................................ 426/285 |
| 5,051,269 | A | * | 9/1991 | Noreille et al. ............... 426/453 |
| 6,117,478 | A | * | 9/2000 | Dubberke ...................... 426/631 |
| 7,201,934 | B2 | * | 4/2007 | Nijhuis et al. ................. 426/631 |
| 7,709,041 | B2 | * | 5/2010 | Purtle et al. ................... 426/631 |
| 8,790,737 | B2 | * | 7/2014 | Miguel et al. ................. 426/631 |
| 2004/0146625 | A1 | * | 7/2004 | Zumbe .......................... 426/593 |
| 2009/0110797 | A1 | * | 4/2009 | Gottemoller et al. ......... 426/548 |
| 2010/0323068 | A1 | * | 12/2010 | Gonus et al. .................. 426/99 |
| 2011/0039007 | A1 | | 2/2011 | Boehm et al. |

* cited by examiner

*Primary Examiner* — Carolyn Paden

(74) *Attorney, Agent, or Firm* — McNees Wallace & Nurick LLC

(57) ABSTRACT

A method of forming cocoa and sugar base agglomerates is disclosed in which cocoa powder and sugar is mixed with an aqueous ethanol solution to form a dough and the dough is dried to form agglomerates of a porous dried dough having less than 0.5% by weight residual ethanol. The dried dough may be broken into pieces or formed into pieces by cutting prior to drying. The resulting pieces of the agglomerate disintegrate instantly in a cold aqueous liquid, such as water or milk, to form a flavored beverage.

19 Claims, No Drawings

COCOA AND SUGAR AGGLOMERATE FOR FLAVORED BEVERAGES AND METHOD OF FORMING SAME

FIELD

This application is directed to agglomerates for forming flavored beverages. More particularly, the present invention is directed to cocoa and sugar based agglomerates for use in creating cold liquid beverages and methods for forming the agglomerates.

BACKGROUND

Many popular consumer beverages are formed by adding a flavored mix to a liquid. The flavored mix is provided in various forms including syrups, powders, and the like. One common consumer beverage category includes chocolate-flavored drinks such as chocolate-flavored milk and hot chocolate.

Production of chocolate-flavored drinks often includes mixing syrup or powder into a liquid. Powdered mixes are typically formed by dry blending powder ingredients, or by spray drying, freeze drying, or a rewet agglomeration process followed by grinding into fine agglomerates or powders. The fine agglomerates or powders used in known mixtures have small particle size. While they can provide good dispersibility/solubility in warm liquids, these small particles have slow dispersibility and/or low solubility in cold liquids. For this reason, syrup is commonly added to make a chocolate-flavored beverage when starting with a cold liquid, even though powdered mixtures are commonly added to a hot liquid.

The small particles of powder mixtures can float, which in combination with general decreased solubility of materials in cold liquids, compounds the difficulty of using powders in those situations. Additionally, the small particles can form a dust which can be messy and increases difficulty in handling and using powder mixtures. The problem of slow dispersibility or low solubility in cold liquids for making chocolate-flavored beverages is further exacerbated by the presence of cocoa powder to provide a chocolate flavor. Cocoa powder is difficult to wet and/or rehydrate in cold liquids.

These and other drawbacks are associated with current materials used for forming flavored cold cocoa or chocolate beverages.

SUMMARY

Exemplary embodiments are directed to a cold liquid cocoa and sugar based agglomerate and methods of forming such agglomerates that readily disintegrate in a cold liquid, such as milk.

According to exemplary embodiments, a method of forming cocoa and sugar based agglomerates comprises mixing cocoa powder, sugar and an aqueous ethanol solution to form a dough and drying the dough to form a porous dried dough piece having less than 0.5% by weight residual ethanol.

Exemplary embodiments are further directed to a process of making agglomerates of 2 mm in size or larger, often 5 mm in size or larger, that submerse and disintegrate instantly into cold aqueous liquids, such as cold water or cold milk. The agglomerates are composed of cocoa powder and a sweetener such as sugars, and typically include other dry ingredients such as milk powders, fibers, corn syrup solids, and flavoring agents. The agglomerates have a porous structure in which the dry powders are lightly bridged by a thin layer of sugar coating. The porous structure is formed by vacuum removal of a solvent that is used to wet and agglomerate dry powder ingredients into pieces.

The pieces formed can be large chunks of 50 mm or greater in size. The chunks can be further reduced into smaller particles or pieces of 2 mm or larger or a sheet of dough can be cut into the desired piece size. The solvent is aqueous ethanol, which controls the solubility of sugar as a binder in forming the agglomerates or large pieces.

In one embodiment, a method of forming cold liquid dispersible/soluble cocoa and sugar based agglomerates includes preparing an aqueous ethanol solution that contains at least 50% by weight ethanol, more preferably about 80% by weight ethanol. The aqueous ethanol solution is added to a pre-blend of dry powders of finely granulated sweeteners, such as 6× sugar, and cocoa powder. The amount of aqueous ethanol solution added to the powder blend is the minimum amount needed to form agglomerates or wet dough, at least 10% (wt/wt) or above, typically about 20% (wt/wt) or above, even preferably about 25% (wt/wt) or above, up to about 40% (wt/wt). The mixture is mixed in a mixer, like a Hobart mixer, to form small agglomerates or a wet dough.

The aqueous ethanol solvent can be removed using a high vacuum drier, e.g. 99% or above vacuum (7600 MmTorr) at a temperature below or above the solvent freezing point and results in a porous structure that can readily submerse, disperse, and dissolve in cold as well as hot aqueous liquid. The relatively larger particle size of 2 mm or greater of the porous particles or pieces can submerse into liquid faster by its own weight, and a thin bridge of sugar coating between dry powder granules dissolves fast and make the whole pieces or chunks disintegrate in both cold or hot liquids almost instantly.

Among the advantages of exemplary embodiments is that methods described herein produce porous cocoa-sugar based agglomerates that disintegrate quickly and thoroughly in cold liquids.

Another advantage is that the methods in accordance with exemplary embodiments provide control over porosity of the agglomerates, which in turn provides control over the dispersibility/solubility of the agglomerates.

Still another advantage is that the methods provides control of binder solubility therefore control of thin bridge between granules, which in turn provides control of dispersibility/solubility of the agglomerates or pieces.

Also another advantage is that the methods produce agglomerates or pieces or chunks in large size, which includes a reduction in the difficulty associated with handling fine powders associated with current powdered beverage mixtures and also helps with portion control.

Other features and advantages of the present invention will be apparent from the following more detailed description of exemplary embodiments that illustrate, by way of example, the principles of the invention.

DETAILED DESCRIPTION OF EXEMPLARY EMBODIMENTS

Provided is an exemplary cold liquid soluble cocoa-sugar based agglomerate and method of forming the cold liquid dispersible/soluble agglomerate. Embodiments of the present disclosure, in comparison to methods and agglomerates not using one or more of the features disclosed herein, aid in rapid, if not instantaneous disintegration (dispersibility in the case of the cocoa powder constituent and solubility in the case of the sugar constituent) in cold aqueous liquids, increase ease of handling, increase ease of use, increase porosity of the agglomerates, decrease bridging strength between particles by solvent controlled solubility of binders, or a combination thereof.

In one embodiment, the method of forming the cold liquid dispersible/soluble cocoa-sugar based agglomerate includes mixing cocoa powder and sugar powder with an aqueous ethanol solution, forming a dough from the cocoa powder and sugar powder and the aqueous ethanol solution, and drying the dough. Optionally, the dough may be cut into pieces before drying or broken into pieces after drying. The pieces may range in size from 2 mm to 50 mm or larger, but are typically in the range of 3 mm to about 20 mm. The resulting agglomerates are cold liquid dispersible/soluble.

The cocoa powder used in exemplary embodiments can be a natural cocoa powder or alkaline cocoa powders or a combination of the two. Lecithin-treated cocoa powder, which has a better wetting ability, may also be employed.

The sugar is a finely granulated sugar and may be a powdered sugar such as 6×, 8× or 10× sugar, although other finely granulated sugars can be used. Other types of sugar that may be used include extra fine sugar, fruit sugar (a slightly finer than regular granulated sugar that may be used in dry mixes such as gelatin, pudding desserts, and powdered drinks), baker's special sugar, caster sugar, as well as superfine sugar, also known as ultrafine and/or bar sugar. The weight ratio of cocoa powder to sugar ranges from about 5:95 to about 70:30, although the majority of the combination is preferably sugar, with typical cocoa powder to sugar weight ratios ranging from about 8:92 to about 50:50. In one embodiment, the weight ratio of cocoa powder to sugar is 10:90. The sugar may be of any composition, but typically is predominantly sucrose.

In addition to cocoa powder and sugar, any number of additional dry ingredients may be incorporated into the dough that is used to form the agglomerates, any or all of which may be pre-mixed or otherwise added in any suitable fashion. These ingredients include those that introduce nutrients, flavor, color, and/or body to the beverage formed using the cocoa-sugar based agglomerates. Exemplary such ingredients include milk solids, dietary fibers such as Inulin, salt, flavoring agents, coloring agents, and lecithin, all by way of example. In some embodiments, it may be desirable to nutritionally fortify the agglomerates by also introducing vitamins and/or minerals. It will be appreciated that the specific types and amounts of ingredients in addition to the cocoa powder and sweetener may vary widely depending upon a particular flavor or other objectives sought to be achieved.

The use of finely ground sugar results in thoroughly distributing the cocoa powder in the sugar. This reduces the cocoa powder lumping together and helps it disperse faster, even in cold (as well as hot) liquids. It also results in the sugar dissolving fast in water.

This combination with water alone as a binder could result in a thicker boundary between sugar-cocoa or sugar-sugar granules after drying and reduce dispersibility/solubility of the final agglomerates in the cold liquid beverage in which it will ultimately be used. Using an aqueous ethanol solution as a binder during production controls the amount of sugar that is dissolved and avoids this potential problem. Instead, the sugar solution formed coats the cocoa powder granules during dough formation and forms a thin bridge between granules when the solvent is subsequently removed that results agglomerates that disintegrate nearly instantaneously when added to a beverage. The sugar coating reduces exposure of the cocoa powder, which is hydrophobic, to the surface of the liquid beverage and increases its hydrophilicity, which allows the cocoa powder to wet and submerse in cold beverages faster.

Without wishing to be bound by theory, exemplary embodiments that make use of an aqueous ethanol solution as a binding solution in combination with a dry blend of cocoa powder and fine sugar to form a dough results in the binding solution's ability to wet the surface of all particles in the dough, resulting in a covering on each particle that is more complete. This in turn has more benefit for cocoa powder hydration and submersing. The sink-ability of the agglomerates increases the ease with which they can be mixed in a cold liquid and the rate at which they disintegrate to form the flavored beverage.

Thus, whatever composition of dry ingredients are employed in addition to the cocoa and sugar powder, the dry ingredients are combined with the aqueous ethanol solution to create a dough, forming a moldable combination of the dry ingredients and the aqueous ethanol solution that can be formed directly into agglomerates and dried, into a sheet of dough that is dried and broken, or into a sheet of dough that is cut into pieces of a pre-determined size that are then dried.

The aqueous ethanol solution includes any suitable concentration of ethanol and water. Suitable concentrations of ethanol and water in the aqueous ethanol solution include at least 50% by weight ethanol and up to 50% by weight water, at least 75% by weight ethanol and up to 25% by weight water, and as much as 90% by weight ethanol and up to 10% by weight water, or any combination, sub-combination, range, or sub-range thereof. In one embodiment, the aqueous ethanol solution includes at least 80% by weight ethanol and up to 20% by weight water.

Higher amounts of ethanol are preferred due to its volatility compared to water, as well as the lower solubility of sugar in ethanol. The concentration of the ethanol in the aqueous ethanol solution is adjusted such that a small amount of sugar is dissolved and therefore weak bridges are formed between the dry powders and the amount of hard pieces from sugar clump/recrystallization are decreased or eliminated as would be the case if water alone was used.

The amount of aqueous ethanol solution used in forming the dough may vary based on the ethanol to water weight ratio in the solution as well as the cocoa powder to sugar weight ratio in the dry blend. In certain embodiments, at least 0.18 g aqueous ethanol solution (80% by weight ethanol) to 1.0 g of a dry blend of the cocoa powder-sugar (20:80 wt/wt) and other dry ingredient ingredients (corresponding to 15% by weight aqueous ethanol solution initially used to form the dough) is required, more typically at least 0.25 g aqueous ethanol solution to 1.0 g of cocoa-sugar and other dry ingredient blend (20% by weight aqueous ethanol solution), and even more typically 0.35 g of aqueous ethanol solution is required for each 1.0 g of mass (26% by weight aqueous ethanol solution) of the cocoa and other dry ingredients. In some embodiments, the aqueous ethanol solution is added to be in the range of 10% to 40% of the total dough weight, preferably about 25% to about 35% by weight.

Higher amounts of solution are used as the amount of cocoa powder increases in the formula. It will be appreciated however, that for the production of smaller agglomerate sizes, such as 2 mm or less, the use of an aqueous ethanol solution could also be used in conjunction with a re-wet agglomeration process, in which case lower relative amounts of the binder (i.e. 15% or less) would be employed.

It will be appreciated that in some cases, some of the sugar could be pre-dissolved into the water that is used to form the ethanol solution and/or that the sugar could be dissolved in the formed aqueous ethanol solution in advance rather than add it as a separate dry ingredient prior to introducing the aqueous ethanol solution.

Once formed, the dough is thereafter dried. Drying the dough includes removing all or substantially all of the ethanol and moisture from the dough, often through evaporation. The evaporation of the ethanol expands or puffs the dried dough or agglomerates. Expansion of the pieces as the ethanol evaporates forms a porous structure.

Although any method of forming pieces and drying the dough may be employed, in one embodiment the formed dough is arranged as a sheet of any desired geometry for subsequently drying the dough into a porous sheet. In some embodiments, the dough is dried as a substantially planar sheet formed to a pre-drying thickness, in other embodiments, the sheet is cut into cubes or other geometry, in which the drying occurs after the individual pieces have already been formed. The pre-drying thickness of the dough is any thickness capable of being dried and, if dried in sheet form, subsequently broken into pieces, although the pre-drying thickness is preferably not greater than the desired maximum piece size. Maintaining the pre-drying thickness below the desired size of the pieces can decrease or avoid the need to use operations that would introduce high shear stresses when the dried dough is broken into pieces, which would also result in higher percentages of powder formation and thus a lower yield of the larger desired agglomerates.

Cutting the dough prior to drying gives greater control over piece size, which can be used to form small pieces that can more easily be measured, for example, with a tablespoon. Cutting the dough into a predetermined piece size also permits the dough to be cut into larger pieces that can be dried into tablets or other form for easy handling by the consumer which may, for example, even be formed into agglomerates of single serving size pieces.

In one embodiment, the dough is dried using a vacuum dryer or a freeze dryer. The vacuum drying takes place at any suitable temperature during the drying of the dough. Suitable temperatures include, between about 20° C. and about 70° C., between about 20° C. and about 50° C., between about 20° C. and about 40° C., or any combination, sub-combination, range, or sub-range thereof. Temperature affects the solubility of sugar in the aqueous ethanol solution. In order to control the amount of sugar dissolved in the solution, exemplary embodiments preferably dry at relatively low temperatures, such as room temperature, at least during the early stages of drying when higher amounts of solvent are still present. In case of freeze drying, a temperature below 0° C. at initial drying stage can be employed.

If vacuum drying is used, a high vacuum dryer with 89.5% or above vacuum (−26.8 in. Hg or 80,000 MmTorr), more preferably 96.6% or above vacuum (−28.9 in. Hg or 25,400 MmTorr), and even more preferably 99% or above vacuum (−29.62 in. Hg or 7,600 MmTorr). The increase in the vacuum pressure results in increases of porosity of the final product and increases drying speed.

As previously noted, the dough may be dried at room temperature or above, up to about 70° C. Preferably, the temperature is gradually increased to speed up the drying process, e.g. from room temperature (i.e., 23° C.) to 40° C. or above at the later stages of drying, after a majority of solvent has been removed.

After drying, the dried dough includes less than 0.5% by weight of ethanol residue, and typically less than 0.1% by weight and may have a moisture content less than about 3% by weight, typically about 2% by weight or less.

If dough sheets were not cut prior to drying, the dried sheets of dough are then broken into pieces of a size within a determined range, forming the final agglomerates. In either case, the desired size range may include between about 2 mm and about 20 mm, between about 2 mm and about 10 mm, and between about 3 mm and about 10 mm. However, due to the porosity of the structure that forms the cold liquid dispersible/soluble agglomerate, it will be appreciated that the size of the pieces has a negligible effect on the rate of disintegration and larger piece sizes, including up to 50 mm or greater, may be employed. Pieces of larger size may be useful, for example, for forming agglomerates of single serving size pieces.

The porosity formed in the pieces of the cold liquid dispersible/soluble cocoa-sugar based agglomerates permits that liquid (i.e., an aqueous beverage, typically water or milk) to penetrate the interior. This increases the surface area of the agglomerates exposed to the liquid that in turn increases the dispersibility/solubility of the agglomerates.

Although the porosity formed by the expansion of the dough decreases the weight of each piece, the increased size of the agglomerate as compared to a powder maintains a desired weight for providing submerse-ability. A typical agglomerate in accordance with exemplary embodiments has density around 0.45 to 0.65 g/cm$^3$ as measured by sugar ball (2 mm) volume displacement test (similar to rapeseed displacement method for bread-loaf volume measurement). Providing a porous structure with increased submerse-ability can also help further increase the rate of disintegration of the cold liquid soluble agglomerate in addition to the thin bridge between the sugar and cocoa particles that form upon drying.

EXAMPLES

Example 1

In a plastic container, 10 g natural cocoa powder and 90 g 10× sugar were blended, to which was added 35 g of 80% (wt/wt) aqueous ethanol solution (i.e. 80% by weight ethanol and 20% by weight water). The constituents were mixed into a soft dough with a spatula. The dough was broken into pieces that were placed in a glass bottle and dried on a freeze drier at 500 or less milliTorrs of vacuum for about 6 h at room temperature (23° C.). The dried pieces had a moisture content of about 1.1% by weight, with less than 0.1% by weight ethanol residual, and a density of 0.58 g/cm$^3$.

Pieces having a mass of 3.5 g and a volume of 6 cm$^3$ were each placed in 150 mL of 4° C. water. For each sample, the pieces showed instant disintegration, with some residual clumping completely dispersing/dissolving in thirty to forty seconds with and without stirring, respectively. Complete dispersing/dissolving was considered to be no more than two or three particles of 1 mm visible at the bottom of the formed beverage.

Comparative Example 1

Commercial sugar cubes of 1.3×1.3×1.3 cm$^3$ having a density of 1.08 g/cm$^3$ were provided. Two pieces, each with a mass of 4.7 g (4.4 cm$^3$), were dissolved completely in 150 mL of 4° C. water in 11 min and 30 min with and without stirring, respectively, (mostly seen as dissolving not disintegration).

Comparative Example 2

Agglomerates were formed with a similar formulation to Example 1 but using only water as the binding agent. The agglomerates had a dried density of 0.52 g/cm$^3$. About 3.9 g agglomerates disintegrated 150 mL of 4° C. water in 11 min to 20 min, with and without stirring respectively.

The agglomerates of Example 1 showed an order of magnitude decrease in time to total dispersion/dissolving, as well as instant disintegration not seen in the comparative examples.

Example 2

In a plastic container, 40 g natural cocoa powder, 40 g non fat dry milk powder, and 120 g 10× sugar were dry blended, to which was added 105 g of 76% (wt/wt) aqueous ethanol solution, the aqueous ethanol solution being 34.5% of the total weight. The mixture was mixed into a soft dough with a spatula. The dough was sheeted to about 3 mm thickness sheet, then placed in a glass bottle, and dried on a freeze drier at 500 or less milliTorrs of vacuum for about 6 h at room temperature (23° C.). The resulting dried pieces had a moisture content of about 2.7% by weight, less than 0.1% by weight residual ethanol content, and a density of 0.49 g/cm³.

2.8 g pieces having a volume of 5.6 cm³ exhibited instant disintegration and were dispersed/dissolved completely in 200 mL of 4° C. water in two to three minutes, with and without stirring, respectively.

Example 3

In a plastic container, 50 g natural cocoa powder and 150 g 10× sugar were dry blended, to which was added 74 g of 80% (wt/wt) aqueous ethanol solution. The mixture was mixed into large agglomerates with a spatula. The agglomerates were placed in a glass bottle, and dried on a freeze drier at 500 or less milliTorrs of vacuum for about 6 h at room temperature (23° C.). The dried pieces had a moisture content of about 1.8% by weight, less than 0.1% by weight residual ethanol content, and a density of 0.65 g/cm³. A 3.0 g piece having a volume of 4.6 cm³ exhibited instant disintegration and dispersed/dissolved completely in 150 mL of 4° C. water in two to three minutes, with and without stirring, respectively.

Example 4

In a plastic container, 50 g alkalized cocoa powder and 50 g 6× sugar were dry blended, to which was added 49 g of 86% (wt/wt) aqueous ethanol solution also containing 1 g lecithin. The mixture was mixed into a wet dough with a spatula. The dough was placed in a glass bottle, and dried on a freeze drier at around 2000 milliTorrs of vacuum for 30 minutes then moved into 45° C. for six hours. The dried pieces had a density of 0.46 g/cm³. A 4.0 g piece with a density of 8.7 cm³ was disintegrated instantly and dispersed/dissolved completely in 150 mL of 4° C. water in two to three minutes, with and without stirring, respectively.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of forming cocoa and sugar base agglomerates, comprising:
    mixing cocoa powder, sugar and an aqueous ethanol solution to form a dough; and
    drying the dough to form agglomerates of a porous dried dough having less than 0.5% by weight residual ethanol.

2. The method of claim 1, wherein the sugar comprises 6× sugar, 8× sugar, 10× sugar, extra fine sugar, fruit sugar, baker's special sugar, caster sugar, superfine sugar, or combinations thereof.

3. The method of claim 1, further comprising arranging the dough into a sheet prior to the step of drying the dough.

4. The method of claim 3, further comprising drying the dough as a sheet.

5. The method of claim 4, further comprising breaking the sheet of dried dough into pieces to form the agglomerates.

6. The method of claim 3, wherein the sheet of dough has a pre-drying thickness between 2 millimeters and 20 millimeters.

7. The method of claim 3, further comprising cutting the sheet of dough prior to the step of drying.

8. The method of claim 1, wherein the drying of the dough is performed under vacuum.

9. The method of claim 1, comprising drying the dough in a vacuum dryer.

10. The method of claim 9, wherein the vacuum dryer is heated to between 20° C. and 40° C.

11. The method of claim 1, comprising drying the dough in a freeze dryer.

12. The method of claim 1, wherein the step of mixing further comprises mixing one or more ingredients selected from the group consisting of milk solids, dietary fibers, Inulin, salt, flavoring agents, coloring agents, lecithin, vitamins, and minerals, with the cocoa powder, sugar and aqueous ethanol solution.

13. The method of claim 1, wherein the aqueous ethanol solution comprises at least 50% by weight ethanol and up to 50% by weight water.

14. The method of claim 1, wherein the aqueous ethanol solution comprises at least 75% by weight ethanol and up to 25% by weight water.

15. The method of claim 14, wherein the aqueous ethanol solution comprises up to 90% by weight ethanol.

16. The method of claim 1, wherein the weight ratio of cocoa powder to sugar is in the range of 5:95 to 70:30.

17. The method of claim 1, wherein the weight ratio of cocoa powder to sugar is in the range of 8:92 to 50:50.

18. The method of claim 1, wherein the dough is formed during the mixing step having an aqueous ethanol content in the range of about 10% to about 40% of the total dough weight.

19. A method comprising:
    forming a dry ingredient mixture comprising cocoa powder and finely granulated sugar selected from the group consisting of 6× sugar, 8× sugar, 10× sugar, extra fine sugar, fruit sugar, baker's special sugar, caster sugar, superfine sugar, and combinations thereof, wherein the weight ratio of cocoa powder to sugar is in the range of 8:92 to 50:50;
    mixing the dry ingredient mixture with an aqueous ethanol solution to form a dough, the aqueous ethanol solution having an ethanol content ranging from 50% to 90% by weight;
    arranging the dough in a sheet;
    cutting the sheet to form dough pieces; and drying the dough under vacuum to form porous dried dough agglomerates, wherein the porous dried dough agglomerates have less than 0.5% by weight ethanol residue and a moisture content of less than 3% by weight.

\* \* \* \* \*